(12) United States Patent
Gehrke et al.

(10) Patent No.: US 10,787,976 B1
(45) Date of Patent: Sep. 29, 2020

(54) SYSTEM AND METHOD FOR ESTIMATING CYLINDER PRESSURE

(71) Applicant: Caterpillar Inc., Deerfield, IL (US)

(72) Inventors: Christopher R. Gehrke, Chillicothe, IL (US); Anthony T. Petrou, Peoria, IL (US); David A. Pierpont, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/388,428

(22) Filed: Apr. 18, 2019

(51) Int. Cl.
*F02D 35/02* (2006.01)
*G01M 15/08* (2006.01)
*F02D 41/14* (2006.01)

(52) U.S. Cl.
CPC ......... *F02D 35/024* (2013.01); *F02D 35/026* (2013.01); *F02D 35/028* (2013.01); *G01M 15/08* (2013.01); *F02D 41/1475* (2013.01)

(58) Field of Classification Search
CPC .... F02D 35/024; F02D 35/026; F02D 35/028; F02D 41/1475; G01M 15/08
See application file for complete search history.

(56) References Cited

U.S. PATENT DOCUMENTS

| | | | |
|---|---|---|---|
| 6,915,776 B2 | 7/2005 | zur Loye et al. | |
| 7,377,262 B2 | 5/2008 | Oki et al. | |
| 9,494,489 B2 | 11/2016 | Hagari | |
| 9,845,743 B2 | 12/2017 | Holst et al. | |
| 2013/0080030 A1* | 3/2013 | Chi | F02D 35/028 |
| | | | 701/103 |

FOREIGN PATENT DOCUMENTS

DE 102012212390 A1 1/2014

* cited by examiner

*Primary Examiner* — Xiao En Mo
(74) *Attorney, Agent, or Firm* — Lee & Hayes, PLLC

(57) ABSTRACT

A method for estimating a peak cylinder pressure associated with operation of an internal combustion engine may include receiving, in a cylinder combustion model, a fuel signal and an air signal. The cylinder combustion model may be configured to estimate at a first crankshaft angle, a first mass fuel burn rate and a first burned fuel-air ratio associated with combustion. The cylinder combustion model may also be configured to estimate at a second crankshaft angle, a combustion ignition delay associated with the combustion, and estimate at the second crankshaft angle, a start of combustion associated with the combustion of the fuel and the air supplied to the cylinder. The cylinder combustion model may be further configured to estimate, based at least in part on the start of combustion, a peak cylinder pressure associated with the combustion of the fuel and the air supplied to the cylinder.

20 Claims, 5 Drawing Sheets

SYSTEM AND METHOD FOR ESTIMATING CYLINDER PRESSURE

TECHNICAL FIELD

The present disclosure relates to a system and method for estimating cylinder pressure, and more particularly, to a system and method for estimating cylinder pressure associated with operation of an internal combustion engine.

BACKGROUND

Internal combustion engines combust fuel and air to produce power. Fuel efficiency and reducing emissions resulting from combustion have become more important in view of regulatory changes related to fuel efficiency standards and reducing emissions. As a result, it has become desirable to increase fuel efficiency and reduce emissions associated with operation of internal combustions engines. More precise control of operation of internal combustion engines enables achievement of higher fuel efficiency and reduced emissions. Such control often relies at least in part on measurement and/or calculation of different parameters involved with operation of the internal combustion engine. Physical sensors may provide a number of such measurements. However, physical sensors may be unable to provide sufficient accuracy and/or responses to dynamically changing conditions of an internal combustion engine. Moreover, in many instances, it is not possible for physical sensors to measure certain parameters, such as, for example, parameters related to conditions inside a cylinder of the internal combustion engine during operation. Thus, physical sensors may be incapable of providing certain information related to operation of the internal combustion engine, or at least with a desired level of accuracy.

An attempt to estimate in-cylinder pressure is described in U.S. Pat. No. 9,494,489 B2 to Hagari ("the '489 patent"), issued Nov. 15, 2016. Specifically, the '489 patent describes an inner-cylinder pressure estimation apparatus including a detection unit that purportedly detects an operation condition of an internal combustion engine, a calculation unit that calculates an ignition delay that is an interval from an ignition timing to a starting timing of heat generation by combustion, based on an operation condition detected by the detection unit, and a combustion velocity calculation unit that calculates a combustion velocity, based on the operation condition. According to the '489 patent, there is simulated a phenomenon that after an ignition delay period following an ignition timing has elapsed, a flame generated at the gap portion of an ignition plug expands up to the inner-cylinder wall surface at the combustion velocity and in the shape of an ellipsoid whose center is the gap portion of the ignition plug.

Although the '489 patent purports to provide an inner-cylinder pressure estimation apparatus, the apparatus of the '489 patent may not render results having a desired accuracy and may not be effective for some engine types. The systems and methods disclosed herein may be directed to mitigating or overcoming one or more of the possible drawbacks set forth above.

SUMMARY

According to a first aspect, a computer-implemented method for estimating a peak cylinder pressure associated with operation of an internal combustion engine may include receiving, in a cylinder combustion model configured to dynamically estimate a plurality of combustion-related parameters associated with combustion in a cylinder of the internal combustion engine, a fuel signal indicative of an amount of fuel supplied to the cylinder of the internal combustion engine and an air signal indicative of an amount of air supplied to the cylinder of the internal combustion engine. The cylinder combustion model may be configured to estimate at a first crankshaft angle, based at least in part on the fuel signal, a first mass fuel burn rate of combustion of the fuel and the air supplied to the cylinder. The cylinder combustion model may also be configured to estimate at the first crankshaft angle, based at least in part on the first mass fuel burn rate and the air signal, a first burned fuel-air ratio associated with the combustion of the fuel and the air supplied to the cylinder, and estimate at the first crankshaft angle, based at least in part on the first burned fuel-air ratio and the first mass fuel burn rate, a first cylinder pressure in the cylinder associated with the combustion of the fuel and the air supplied to the cylinder. The cylinder combustion model may also be configured to estimate at the first crankshaft angle, based at least in part on the first cylinder pressure, a first cylinder temperature associated with the combustion of the fuel and the air supplied to the cylinder. The cylinder combustion model may also be configured to estimate at a second crankshaft angle, based at least in part on the first cylinder temperature, a combustion ignition delay associated with the combustion of the fuel and the air supplied to the cylinder, and estimate at the second crankshaft angle, based at least in part on the combustion ignition delay and an associated threshold value, a start of combustion associated with the combustion of the fuel and the air supplied to the cylinder. The cylinder combustion model may be further configured to estimate, based at least in part on the start of combustion, a peak cylinder pressure associated with the combustion of the fuel and the air supplied to the cylinder.

According to a further aspect, a computer-readable storage medium having computer-executable instructions stored thereupon which, when executed by a computer, may cause the computer to receive a fuel signal indicative of an amount of fuel supplied to a cylinder of an internal combustion engine during operation. The computer may be further caused to receive an air signal indicative of an amount of air supplied to the cylinder of the internal combustion engine during operation. The computer may also be caused to estimate at a first crankshaft angle, based at least in part on the fuel signal, a first mass fuel burn rate of combustion of the fuel and the air supplied to the cylinder, and estimate at the first crankshaft angle, based at least in part on the first mass fuel burn rate and the air signal, a first burned fuel-air ratio associated with the combustion of the fuel and the air supplied to the cylinder. The computer may be further caused to estimate at the first crankshaft angle, based at least in part on the first burned fuel-air ratio and the first mass fuel burn rate, a first cylinder pressure in the cylinder associated with the combustion of the fuel and the air supplied to the cylinder. The computer may also be caused to estimate at the first crankshaft angle, based at least in part on the first cylinder pressure, a first cylinder temperature associated with the combustion of the fuel and the air supplied to the cylinder. The computer may be further caused to estimate at a second crankshaft angle, based at least in part on the first cylinder temperature, a combustion ignition delay associated with the combustion of the fuel and the air supplied to the cylinder, and estimate at the second crankshaft angle, based at least in part on the combustion ignition delay and an associated threshold value, a start of combustion associated with the combustion of the fuel and the air supplied to the cylinder. The computer may also be caused to estimate, based at least in part on the start of combustion, a peak cylinder pressure associated with the combustion of the fuel and the air supplied to the cylinder.

According to another aspect, a system for estimating a peak cylinder pressure associated with operation of an internal combustion engine may include at least one processor configured to cause execution of a cylinder combustion model configured to dynamically estimate a plurality of combustion-related parameters associated with combustion in the cylinder of the internal combustion engine. The cylinder combustion model may be configured to receive a fuel signal indicative of an amount of fuel supplied to a cylinder of the internal combustion engine, and receive an air signal indicative of an amount of air supplied to the cylinder of the internal combustion engine. The cylinder combustion model may also be configured to estimate at a first crankshaft angle, based at least in part on the fuel signal, a first mass fuel burn rate of combustion of the fuel and the air supplied to the cylinder, and estimate at the first crankshaft angle, based at least in part on the first mass fuel burn rate and the air signal, a first burned fuel-air ratio associated with the combustion of the fuel and the air supplied to the cylinder. The cylinder combustion model may be further configured to estimate at the first crankshaft angle, based at least in part on the first burned fuel-air ratio and the first mass fuel burn rate, a first cylinder pressure in the cylinder associated with the combustion of the fuel and the air supplied to the cylinder, and estimate at the first crankshaft angle, based at least in part on the first cylinder pressure, a first cylinder temperature associated with the combustion of the fuel and the air supplied to the cylinder. The cylinder combustion model may also be configured to estimate at a second crankshaft angle, based at least in part on the first cylinder temperature, a combustion ignition delay associated with the combustion of the fuel and the air supplied to the cylinder, and estimate at the second crankshaft angle, based at least in part on the combustion ignition delay and an associated threshold value, a start of combustion associated with the combustion of the fuel and the air supplied to the cylinder. The cylinder combustion model may also be configured to estimate, based at least in part on the start of combustion, a peak cylinder pressure associated with the combustion of the fuel and the air supplied to the cylinder. The system may also include an output device in communication with the at least one processor and configured to output an indication of the peak cylinder pressure.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

DETAILED DESCRIPTION

Figure 1:
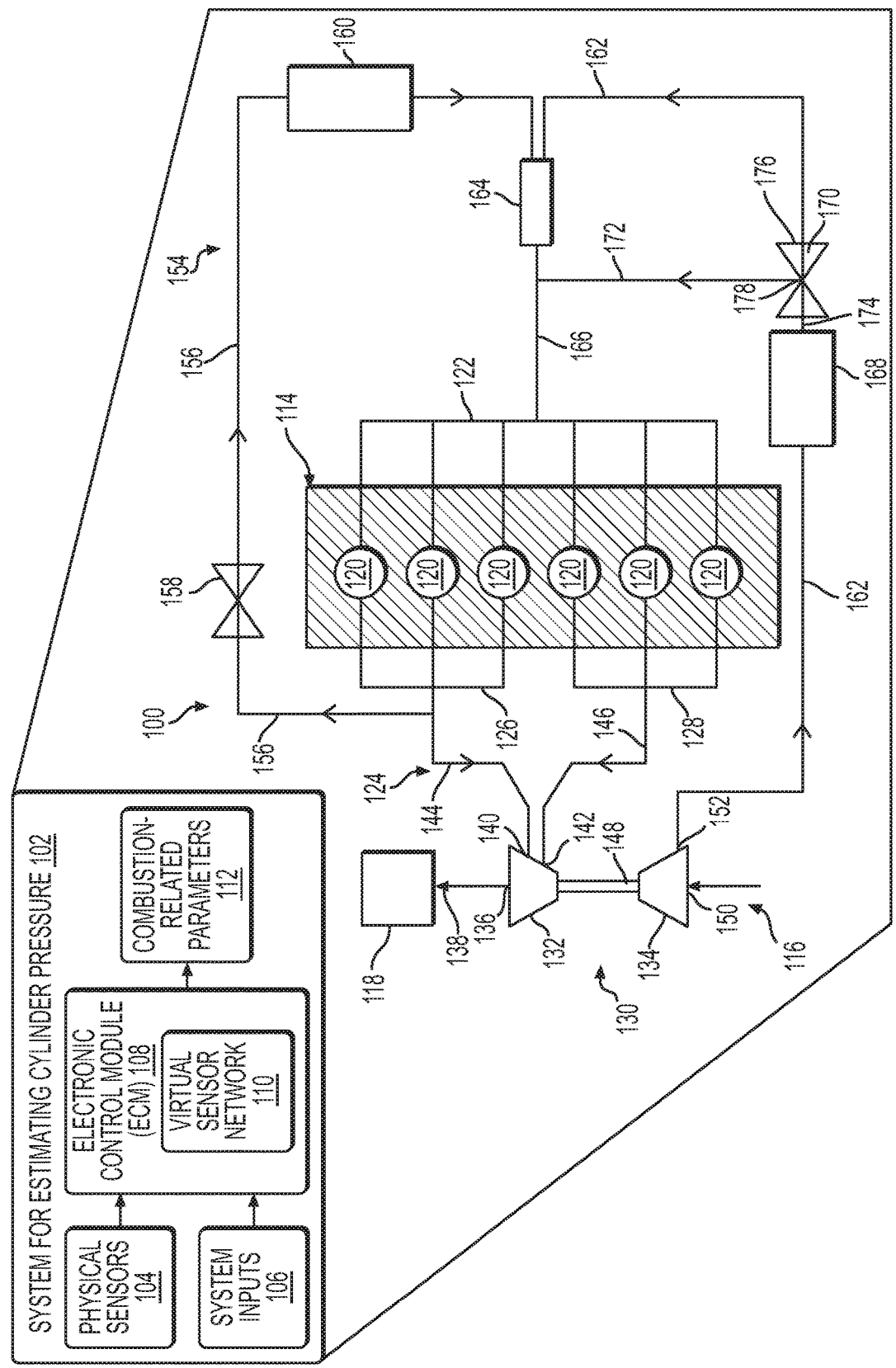
FIG. 1 is a schematic view of an example internal combustion engine and an example system for estimating cylinder pressure.

FIG. 1 schematically depicts an example internal combustion engine 100 and an example system for estimating cylinder pressure 102 associated with operation of example internal combustion engine 100. Example internal combustion engine 100 is merely an example, and internal combustion engine 100 may be a compression-ignition engine, a spark-ignition engine, a homogeneous-charge compression ignition engine, a two-stroke engine, a four-stroke, a six-stroke engine, or any type of internal combustion engine known to those skilled in the art. In some examples, as explained herein, system for estimating cylinder pressure 102 may be configured to receive and/or generate one or more signals from one or more physical sensors 104 and/or receive and/or generate one or more system inputs 106 (e.g., data related to the structure of internal combustion engine 100), for example, at an electronic control module (ECM) 108, which in some examples may include a virtual sensor network 110, which may, in turn, estimate one or more combustion-related parameters 112 (e.g., peak cylinder pressure) associated with combustion occurring in one or more cylinders of internal combustion engine 100. Physical sensors 104 may include any physical sensor types, such as, for example, temperature sensors, pressure sensors, flow sensors, etc.

As schematically depicted in FIG. 1, example internal combustion engine 100 includes a single cylinder bank 114, a turbocharger system 116, and an exhaust aftertreatment system 118. Although a single cylinder bank 114 is shown, it is contemplated that internal combustion engine 100 may include multiple cylinder banks. Example cylinder bank 114 includes six cylinders 120 for combustion, but it is contemplated that cylinder bank 114 may include fewer cylinders 120 (e.g., one, two, three, four, or five cylinders) or more cylinders (e.g., 8, 10, 12, 16, etc., cylinders). In some examples, cylinders 120 may be coupled to one or more intake manifolds 122 and one or more exhaust manifolds 124. Intake manifold(s) 122 may be in flow communication with each cylinder 120 for providing an air-fuel mixture to each cylinder 120 for combustion. A fuel, such as, for example, diesel fuel, gasoline, alcohol, natural gas, mixtures thereof, and/or any known suitable fuel, may be injected into each cylinder 120 and combusted therein, for example, in a known manner.

Example internal combustion engine 100 may include a first exhaust manifold 126 and a second exhaust manifold 128, and first exhaust manifold 126 may be in flow communication with three of cylinders 120, and second exhaust manifold 128 may be in flow communication with three other combustion cylinders 120. Example turbocharger system 116 includes a turbocharger 130 having a turbine 132 and a compressor 134. Example turbine 132 includes a turbine outlet 136 in flow communication with an inlet 138 to exhaust aftertreatment system 118, a first inlet path 140 in flow communication with first exhaust manifold 126, and a second inlet path 142 in flow communication with second exhaust manifold 128. A first conduit 144 provides flow communication between first exhaust manifold 126 and first inlet path 140, and a second conduit 146 provide flow communication between second exhaust manifold 128 and second inlet path 142. In some examples, a turbine wheel of turbine 132 and a compressor wheel of compressor 134 may be coupled to one another by a shaft 148, which causes the turbine wheel and compressor wheel to rotate with one another. Compressor 134 may include a compressor inlet 150 and a compressor outlet 152. Compressor inlet 150 is configured to receive a compressible medium (e.g., such as ambient air) and compress the compressible medium. Compressor outlet 152 supplies the compressed medium to intake manifold 122, so that it may be used for combustion in one or more of cylinders 120.

The example internal combustion engine 100 shown in FIG. 1 also includes an exhaust gas recirculation (EGR) system 154. In the example shown, internal combustion engine 100 includes conduit 156 configured to receive exhaust gas from first exhaust manifold 126 and direct the exhaust gas to intake manifold 122. Conduit 156 is in flow communication with first conduit 144 and includes a valve 158 for controlling the flow of exhaust gas through conduit 156. Some examples may include a cooler 160 associated with conduit 156, for example, to lower the temperature of exhaust gas provided to intake manifold 122. A conduit 162 is in flow communication with compressor outlet 152 and a mixer 164. Mixer 164 may, in some examples, also receive exhaust gas flow from conduit 156, and may be configured to control the mixture of compressed combustion gas received from compressor 134 with exhaust gas recirculated from EGR system 156 and may provide the mixture thereof to intake manifold 122 through a conduit 166.

Example internal combustion engine 100 may also include an aftercooler 168 and a valve 170 in conduit 162, and example valve 170 may be configured to direct compressed media (e.g., compressed gas) to mixer 164 or through a conduit 172 directly to conduit 166, thereby bypassing mixer 164. In some examples, valve 170 may include an inlet 174 in flow communication with conduit 162 and may receive compressed media from compressor 134. In some examples, valve 170 may further include a first outlet 176 in flow communication with conduit 162, for directing compressed media (e.g., combustion gas) to mixer 164, and a second outlet 178 in flow communication with conduit 172.

During example operation, a fuel, such as, for example, diesel fuel, may be injected according to a firing order into cylinders 120 and combusted when a piston disposed within each cylinder 120 is at or near a top-dead-center position in the respective cylinder 120. Exhaust gas generated during combustion is permitted to flow (e.g., via opening of an exhaust valve) from a respective cylinder 120 to an associated exhaust manifold 124 (e.g., either first exhaust manifold 126 or second exhaust manifold 128). Exhaust gas within first exhaust manifold 126 is permitted to flow to first inlet path 140, and exhaust gas from second exhaust manifold 128 is permitted to flow to second inlet path 142, which rotatably drive a turbine wheel of turbine 132. Turbine 132, in turn, rotatably drives compressor 134 via shaft 148. Thereafter, the exhaust gas may be discharged from turbine 132 to exhaust after treatment system 118 via turbine outlet 136.

In some examples, for example, as shown in FIG. 1, exhaust gas may be recirculated from first exhaust manifold 126 to intake manifold 122 via conduit 156, mixer 164, and conduit 166. Compressor 134 draws combustion media (e.g., air) into compressor inlet 150. The media is compressed in compressor 134 and is discharged from compressor 134 via compressor outlet 152 and conduit 162. The compressed combustion media may be cooled as is passes through aftercooler 168 and is permitted to flow to intake manifold 122, for example, via mixer 164 and conduit 166 for use in combustion occurring within cylinders 120. In some examples, mixer 164 may be configured to combine fluid flow from conduit 156 of EGR system 154 and from conduit 162, and supply the mixture to intake manifold 122 via conduit 166. In some examples, valve 170 may be configured to selectively allow bypassing of some (or all) of the compressed gas flow in conduit 162 to conduit 166 and intake manifold 122, bypassing mixer 164. In some examples, EGR flow rate in conduit 156 may be controlled by, for example, valve 158.

Figure 2:
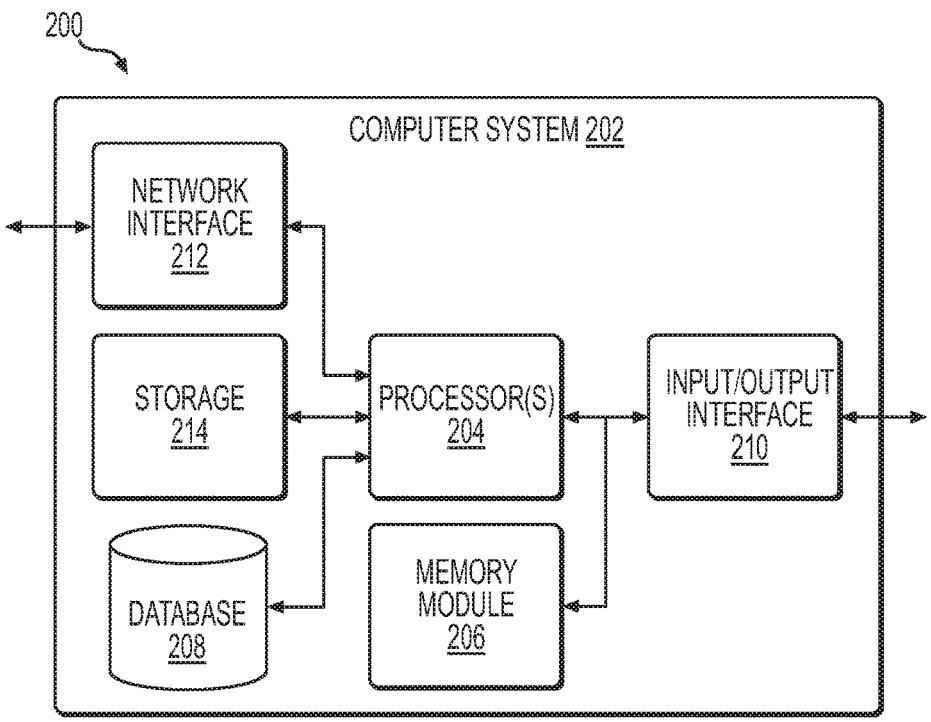
FIG. 2 is a block diagram of an example architecture for an example computer system consistent with example systems and methods described herein.

FIG. 2 is a block diagram of an example architecture 200 for an example computer system 202 consistent with example systems and methods described herein. As shown in FIG. 2, computer system 202 (e.g., which may execute virtual sensor network 110, etc., (FIG. 1)) may include one or more processor(s) 204, a memory module 206, a database 208, an Input/Output interface 210, a network interface 212, and/or storage 214. Computer system 202 may include fewer, additional, and/or other components.

Example processor(s) 204 may include any appropriate type of general purpose microprocessor, digital signal processor, or microcontroller. In some examples, processor(s) 204 may be configured as a separate processor module dedicated to controlling internal combustion engine 100. Alternatively, or in addition, processor(s) 204 may be configured as a shared processor module for performing functions unrelated to virtual sensor network 110.

Memory module 206, in some examples, may include one or more memory devices including, but not limited to, a read-only memory (ROM), a flash memory, a dynamic random-access memory (RAM), and/or a static RAM. Memory module 206, in some examples, may be configured to store information, which may be used by processor(s) 204. In some examples, database 208 may include any type of appropriate database including information related to, for example, characteristics of measured parameters, sensing parameters, mathematical models and/or thermodynamic models, and/or any other information related to control and/or analysis of operation of internal combustion engine 100.

In addition, input/output interface 210 may be configured to receive data from various sensors (e.g., physical sensors 104 and/or virtual sensors associated with virtual sensor network 110), and/or to transmit data to such components and/or to ECM 108, for example. Network interface 212, in some examples, may include any appropriate type of network device capable of communicating with other computer systems, for example, based on one or more wired or wireless communication protocols. In some examples, storage 214 may include any appropriate type of mass storage configured to store any type of information that processor(s) 204 may access for operation. For example, storage 214 may include one or more hard disk devices, optical disk devices, and/or other storage devices to provide storage space. Any or all of the components of example computer system 202 may be implemented and/or integrated into an application-specific-integrated-circuit (ASIC) and/or field-programmable-gate-array (FPGA) device.

Figure 3:
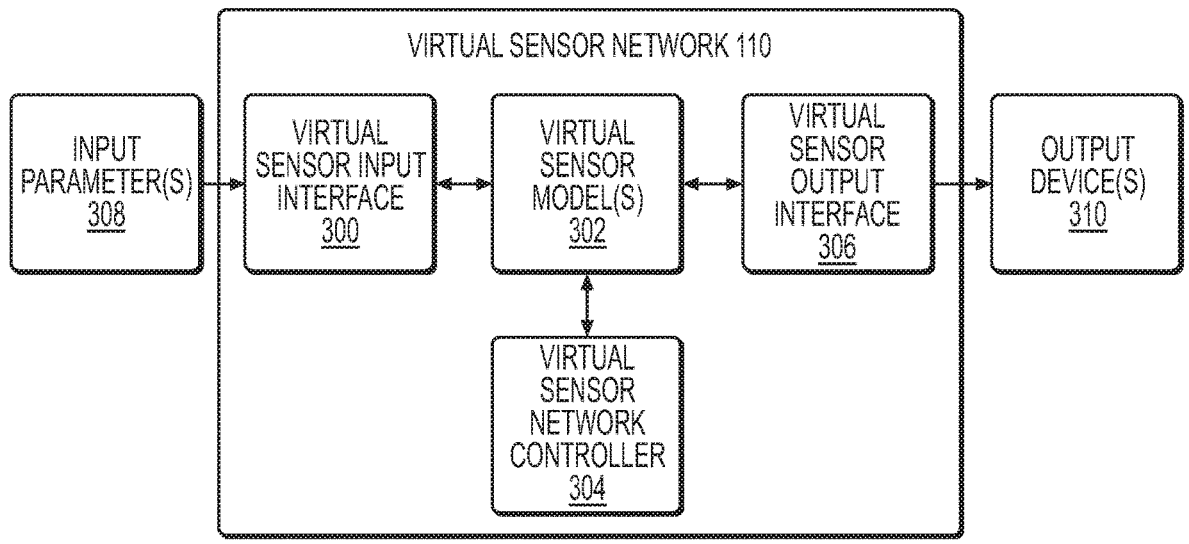
FIG. 3 is a block diagram of an example virtual sensor network.

FIG. 3 is a block diagram including an example virtual sensor network 110. As shown in FIG. 3, example virtual sensor network 110 may include a virtual sensor input interface 300, one or more virtual sensor model(s) 302, a virtual sensor network controller 304, and/or a virtual sensor output interface 306. In some examples, one or more input parameters 308 (e.g., one or more signals received from physical sensor(s) 104 and/or system inputs 106 (FIG. 1)) may be received by virtual sensor input interface 300, and virtual sensor output interface 306 may be in communication with one or more output device(s) 310 for providing one or more combustion-related parameters 112, for example, as described herein. Output device(s) 310 may be configured to display information related to the one or more combustion-related parameters 112 and/or other information, either directly (e.g., as schematically depicted by the arrow) or via the one or more networks. For example, the combustion-related parameters 112 may be communicated directly via a hard-wired connection to output device(s) 310, which may be an integral part of a device associated with one or more processors (e.g., processors 204), may be located in the same general vicinity as the one or more processors (e.g., in the same room or the same building), or may be located remotely from the one or more processors, but in communication via a hard-wired connection.

In some examples, output device(s) 310 may include a hand-held device configured to be carried by a person. For example, output device(s) 310 may include any computer device including a transceiver for sending and receiving signals, for example, via one or more networks. For example, output device(s) 310 may be configured to display a user interface configured to display a representation of combustion-related parameters 112. In some examples, combustion-related parameters 112 may be communicated, either directly or via the one or more networks, to an output device at a service center, which may be, for example, a location at which the condition, operation, and/or maintenance of internal combustion engine 100 may be monitored, or at which service and/or maintenance of internal combustion engine 100 may be performed, such as, for example, a location associated with the manufacturer of internal combustion engine 100, a machine carrying internal combustion engine 100, and/or a location associated with a third party responsible for fulfilling a service and/or maintenance contract associated with internal combustion engine 100.

Virtual sensor network 110 may refer to one or more virtual sensor model(s) 302 integrated as a collection of virtual sensors to provide sensing functionalities under a central control unit. Virtual sensor network 110, in some examples, may not be a simple or mechanical aggregation of multiple virtual sensor model(s) 302. Virtual sensor model(s) 302 in virtual sensor network 110 may, in some examples, be integrated to operate with a particular system, and/or the operation of virtual sensor model(s) 302 may be controlled collectively.

In some examples, virtual sensor input interface 300 may include any appropriate interface, such as an input/output interface and/or a data link, etc., configured to obtain information (e.g., via one or more sensor signals) from various physical sensors (e.g., physical sensors 104 shown in FIG. 1). Such information may include, for example, values associated with input parameters and/or control parameters of the physical sensors, operational status of the physical sensors, and/or values of output parameters associated with the physical sensors. Such information may be provided to virtual sensor input interface 300 as input parameters 308.

Virtual sensor output interface 306, in some examples, may include any appropriate interface, such as an input/output interface and/or an ECM/xPC interface, etc., configured to provide information from virtual sensor model(s) 302 and virtual sensor network controller 304 to external systems, such as ECM 108, and/or to an external user of virtual sensor network 110. The information may be provided to external systems and/or users (e.g., via output device(s) 310) as one or more combustion-related parameters 112.

Virtual sensor model(s) 302 may include a plurality of virtual sensors, such as virtual emission sensors, virtual fuel sensors, and virtual speed sensors, etc. Any virtual sensor may be included in virtual sensor model(s) 302. In some examples, virtual sensor model(s) 302 may leverage a certain amount of computational resource for operation. For example, a virtual sensor model may leverage storage in a certain amount of memory. The program code and data associated with the virtual sensor model may be loaded into memory to be executed by one or more processors (e.g., processor(s) 204). Execution of the virtual sensor model may leverage a certain amount of processing time of the one or more processors. Other computational resources, such as input/output operations, display operations, etc., may also be leveraged by one or more virtual sensor model(s) 302.

The overall computational resources used by a virtual sensor model may be referred to as a "footprint" of the virtual sensor model. The size of the footprint, such as, the overall amount of the required computational resources, may relate to the complexity of the virtual sensor model, the type of the virtual sensor model, and/or the accuracy of the virtual sensor model. A footprint of a virtual sensor network may include footprints of all virtual models in virtual sensor network 110, in addition to a certain amount of computational resources used by certain virtual sensor network functionalities, such as, for example, control and/or validation functions. The plurality of virtual sensors may be integrated into virtual sensor model(s) 302 of virtual sensor network 110 by, for example, computer system 202, such that the footprint for virtual sensor network 110 may be optimized.

Figure 4:
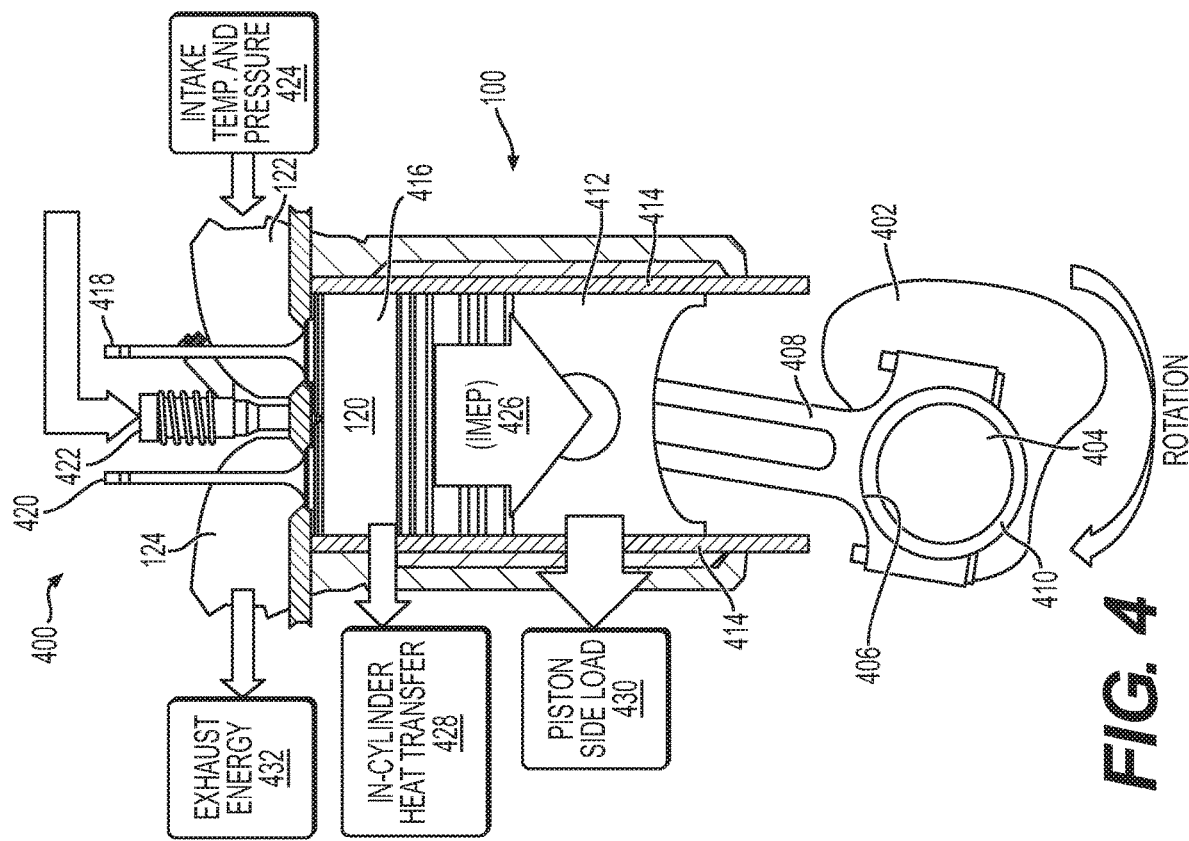
FIG. 4 is a schematic side view of an example combustion cylinder of an example internal combustion engine showing example combustion-related parameters.

FIG. 4 is a schematic side view of an example cylinder system 400 of an example internal combustion engine, which may correspond to example internal combustion engine 100 shown in FIG. 1, during an example power stroke in which combustion occurs in example cylinder 120 of cylinder block 114. FIG. 4 shows an example single cylinder 120 and related components for the purpose of description, but additional and/or different cylinder systems are contemplated.

The example cylinder system 400 includes a crankshaft 402 rotatably supported in cylinder block 114, for example, via one or more bearings coupled to cylinder block 114. Example crankshaft 402 includes a crankpin 404, about which an aperture 406 in a connecting rod 408 is coupled, and which rotates on bearings 410 within aperture 406 of connecting rod, as crankshaft 402 rotates though three-hundred-sixty degrees. An end of connecting rod 408 opposite crankpin 404 is rotatably coupled to a piston 412, for example, via a pin. Example cylinder 120 shown in FIG. 4 includes an example cylinder liner 414 within which piston 412 slides and reciprocates during operation of internal combustion engine 100. In the example shown, example cylinder 120 and example piston 414 define a combustion chamber 416 that expands and contracts as piston 412 reciprocates within cylinder 120.

Example cylinder system 400 also includes an intake valve 418 configured to open and provide flow communication with combustion chamber 416 and permit air for combustion to enter combustion chamber 416 via intake manifold 122, and to close to substantially seal combustion chamber 416 during the power stroke and/or the compression stroke. Example cylinder system 400 also includes an exhaust valve 20 configured to open and provide flow communication between combustion chamber 416 and exhaust manifold 124 and to permit combusted air and fuel following combustion to enter exhaust manifold 124, and to close to substantially seal combustion chamber 416 during the power stroke and/or the compression stroke. Example cylinder system 400 also includes a fuel injector 422 configured to selectively supply fuel to combustion chamber 416, for example, in a substantially atomized form to promote even and/or efficient combustion.

During operation, according to some examples, piston 412 may travel down cylinder 120 (e.g., away from intake valve 418) during an intake stroke, while intake valve 418 is at least partially open and exhaust valve 420 is substantially closed (e.g., but not necessarily completely closed), drawing air into combustion chamber 416 at an intake temperature and intake pressure 424 while crankshaft 402 rotates. When piston 412 reaches its lowest point of travel down cylinder 120 (e.g., bottom-dead-center), intake valve 418 may close, and a compression stroke may begin as piston 412 reverses direction and travels within cylinder 120 back toward intake valve 418, increasing the pressure in combustion chamber 416. In some examples, fuel injector 422 may activate and supply fuel to combustion chamber 416 as piston 412 reaches the top end of its stroke (e.g., top-dead-center) and/or shortly thereafter. In some examples (e.g., when cylinder system 400 is part of a compression-ignition engine), the temperature and/or pressure in combustion chamber 416 will cause a mixture of fuel and air supplied to combustion chamber 416 to ignite and combust, with intake valve 418 and exhaust valve 420 closed (or substantially closed), substantially commencing a power stroke, during which piston 412 is forced under pressure in combustion chamber 416 away from intake valve 418 and exhaust valve 420, thereby driving crankshaft 402 to rotate via its connection to crankpin 404 of crankshaft 402. After piston 412 reaches the end of its downward stroke, exhaust valve 420 may open, providing flow communication between combustion chamber 416 and exhaust manifold 124. As piston 412 travels toward exhaust valve 420 during an exhaust stroke, byproducts of combusting the air and fuel are pushed to exhaust manifold 124. This example cycle may be repeated thereby generating power.

FIG. 4 shows an example of a partially completed power stroke, during which combustion occurs in cylinder 120. Once combustion commences, piston 412 is subjected to increasing temperature and pressure due to combustion. The indicated mean effective pressure (IMEP) 426 is reflective of the net work done on piston 412 by the gas in combustion chamber 416. As the temperature and pressure increase, in-cylinder heat transfer 428 occurs, transferring heat through cylinder liner 414 and into cylinder block 114. Piston 412 is subjected to a piston side load 430. As exhaust valve 420 opens during the exhaust stroke, with piston 412 travelling back toward exhaust valve 420, exhaust energy 432 (e.g., in the form of heat, pressure, combustion by-products, etc.) is expelled through exhaust manifold 124.

Figure 5:
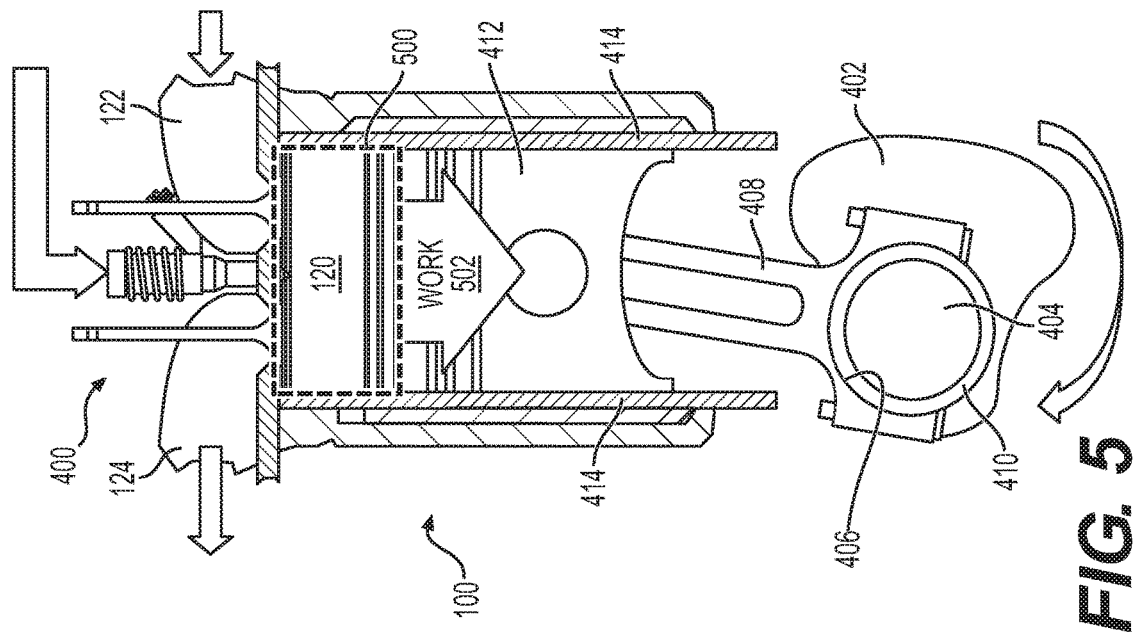
FIG. 5 is a schematic side view of the example combustion cylinder and internal combustion engine shown in FIG. 4 shown an example control volume.

FIG. 5 is a schematic side view of the example combustion cylinder 400 and internal combustion engine 100 shown in FIG. 4, identifying an example control volume 500, which may be used, for example, to characterize discrete moments during combustion in combustion chamber 416, which generates work 502. Example control volume 500 expands and contracts as piston 412 reciprocates in cylinder 120, for example, as explained with respect to FIG. 4.

Figure 6:
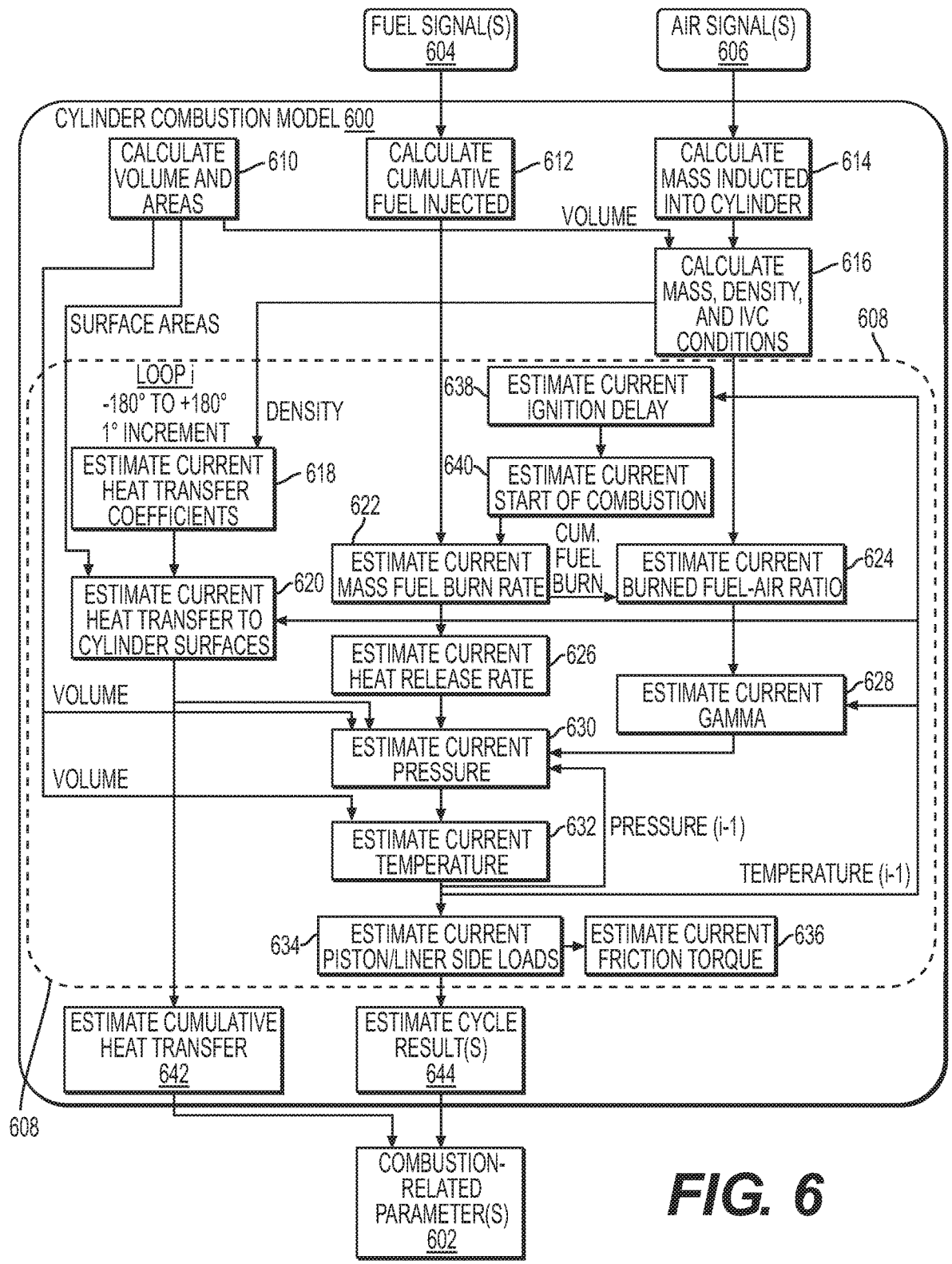
FIG. 6 is a flowchart of an example cylinder combustion model for estimating combustion-related parameters associated with example combustion in an example cylinder of an example internal combustion engine.

FIG. 6 is a flowchart of an example cylinder combustion model 600 for estimating combustion-related parameters 602 associated with combustion in an example cylinder 120 of an example internal combustion engine, which may correspond to example internal combustion engine 100, as described herein. For example, example cylinder combustion model 600 may be configured to receive at least one of one or more fuel signal(s) 604 indicative of an amount of fuel supplied to a cylinder of an internal combustion engine or one or more air signal(s) 606 indicative of an amount of air supplied to the cylinder of the internal combustion engine. In some examples, cylinder combustion model 600 may be configured to dynamically estimate a plurality of combustion-related parameters 602 associated with combustion in the cylinder of the internal combustion engine, as explained herein. In some examples, cylinder combustion model 600 may be configured to also receive system inputs 106 (see, e.g., FIG. 1), which may be indicative of dimensions and/or related information associated with cylinder 120, piston 412, connecting rod 408, crankshaft 402, an offset of crankpin 404 relative to the rotation axis of crankshaft 402, and/or any related components of internal combustion engine 100.

As shown in FIG. 6, example cylinder combustion model 600 is configured to estimate combustion-related parameters 602 associated with discrete angles of crankshaft 402, for example, as crankshaft 402 rotates from an orientation (or angle) of minus-180 degrees to an orientation (or angle) of plus-180 degrees, which may correspond to a compression stroke (e.g., from minus-180 degrees to 0 degrees (e.g., top-dead-center of the travel of piston 412 in cylinder 120)) and a power stroke (e.g., from 0 degrees to plus-180 degrees (e.g., bottom-dead-center of the travel of piston 412 in cylinder 120)). In some examples, cylinder combustion model 600 may begin calculation upon closing of intake valve 418, which may occur, in some examples, prior to minus-180 degrees (e.g., if internal combustion engine operates according to a Miller-type cycle). For example, the example cylinder combustion model 600 shown in FIG. 6 includes an incrementing model 608 configured to perform a sequential series of estimations for a given crankshaft angle, and upon completion of the estimations for the given crankshaft angle, increment the crankshaft angle by an incremental step (i) to an incremented crankshaft angle, and perform the sequential series of estimations for the incremented crankshaft angle. The incremental step (i) may, in some examples, have a constant magnitude (e.g., one, two, three, etc., degree(s)) (see, e.g., FIG. 6, which schematically depicts a constant 1-degree increment), or may have a variable magnitude that changes depending on the orientation of the crankshaft 402. For example, for some portions of the compression stroke and/or power stroke, it may be desirable to reduce the magnitude of the increment (e.g., to less than one degree) in order to obtain a greater number of data points, for example, for portions of the compression stroke and/or the power stroke that are more complex or are of greater interest, for example, around top-dead-center of the stroke of piston 412. In other portions of the compression stroke and/or the power stroke, the magnitude of the increment may be greater than one degree, for example, due to a lower complexity and/or less interest in the corresponding crankshaft angles, for example, around a position of piston 412 at bottom-dead-center.

As explained herein, after performing a series of sequential estimations by incrementing model 608, for example, for a given range of crankshaft orientations (e.g., minus-180 degrees through plus-180 degrees), cylinder combustion model 600, in some examples, may estimate cumulative combustion-related parameters (e.g., including combustion-related parameters 602). Thus, in some examples, cylinder combustion model 600 may be configured to receive one or more of system inputs 106, fuel signal(s) 604, or air signal(s) 606, estimate combustion-related parameters using incrementing model 608 for a plurality of crankshaft angles associated with a range of angles through which crankshaft 402 rotates (e.g., throughout angles associated with a combustion event), and use those estimations to estimate cumulative combustion-related parameters associated with at least a portion of the range of angles (e.g., through the whole range), such as, for example, one or more of cumulative heat transfer associated with the combustion event, indicated mean-effective pressure (IMEP), peak cylinder pressure, friction mean-effective pressure (FMEP), maximum piston side load, maximum cylinder liner bending moment, gross indicated mean-effective pressure (GIMEP), characteristics of heat flux to cylinder surfaces, total in-cylinder heat transfer, friction energy to piston and bearings, etc.

As shown in FIG. 6, example cylinder combustion model 600 includes a plurality of modules and/or sub-models configured to calculate and/or estimate combustion-related parameters associated with a combustion event (e.g., a single combustion associated with a compression stroke and/or a power stroke of internal combustion engine 100). In some examples, cylinder combustion model 600 may be executed without fuel, for example, which may result in no combustion occurring, which may be used, for example, to model a motoring profile of internal combustion engine 100, which may correlate to the amount of work performed to compress the gas and/or the resulting temperatures and/or pressures in combustion chamber 416. Unless otherwise noted herein, the modules and/or models perform calculations in a manner consistent with known mathematical models based on the principles of thermodynamics and/or mathematical models of combustion in internal combustion engines.

In the example cylinder combustion model shown in FIG. 6, at 610, cylinder combustion model 600 may be configured to receive system inputs 106 and calculate volumes and/or areas (e.g., surface areas) associated with cylinder 120 and/or piston 412, for example, based on geometries associated with cylinder 120, piston 412, connecting rod 408, crankshaft 402, an offset of crankpin 404, and/or any related components of internal combustion engine 100. The volumes and/or areas may be used for further calculations and/or estimations, as described herein.

In the example shown, at 612, cylinder combustion model 600 may be configured to receive one or more fuel signal(s) 604 and calculate cumulative fuel injected during a combustion event. For example, fuel signal(s) 604 may include one or more signals from an electronic control module (e.g., ECM 108, FIG. 1) and/or one or more signals indicative of the start of injection (SOI) and/or the end of injection (EIO), and based at least in part on such signals, calculate cumulative fuel injected for the combustion event.

At 614, example cylinder combustion model 600 may be configured to receive one or more air signal(s) 606 and calculate the mass of air inducted into cylinder 120. For example, the one or more air signal(s) 606 may include one or more signals indicative of, for example, total mass air flow (TMAF, e.g., from a virtual sensor), exhaust gas recirculation (EGR) mass air flow (EMAF), intake manifold air pressure (IMAP), and/or intake manifold air temperature (IMAT), and cylinder combustion model 600 may be configured to calculate the total mass of air inducted into cylinder 120 for combustion. In some examples, the air inducted into cylinder 120 may be pressurized (e.g., via turbocharger 130) and may include ambient air and/or gases from exhaust aftertreatment system 118 and/or EGR system 154.

Example cylinder combustion model 600, at 616, may also be configured to calculate, based at least in part on a volume determined at 610 and/or the mass determined at 614, the mass and/or density at the closing time for intake valve 418.

In the example shown, cylinder combustion model 600 may use one or more of the determinations from 610, 612, and/or 614 as inputs for incrementing model 608. For example, at a first angle of crankshaft 402, incrementing model 608, at 618, may estimate current heat transfer coefficients (e.g., the heat transfer coefficients at the current crankshaft angle and/or at the time associated with the current crankshaft angle). Based at least in part on the determined current heat transfer coefficients at 618 and/or the surface area(s) determined at 610, at 620, cylinder combustion model 600 may be configured to estimate a current heat transfer to surfaces of cylinder 120.

At 622, cylinder combustion model 600 may be configured to estimate a current mass fuel burn rate (e.g., the mass fuel burn rate at the current crankshaft angle and/or at the time associated with the current crankshaft angle) based at least in part on the cumulative fuel injected determined at 612.

At 624, example cylinder combustion model 600 may be configured to estimate a current burned air-fuel ratio (e.g., the burned air-fuel ratio at the current crankshaft angle and/or at the time associated with the current crankshaft angle) based at least in part on the current mass fuel burn rate determined at 622 and/or the mass and/or density at the intake valve closing determined at 616.

The example cylinder combustion model 600, at 626, may be configured to estimate a current heat release rate (e.g., the heat release rate at the current crankshaft angle and/or at the time associated with the current crankshaft angle) based at least in part on the current mass fuel burn rate determined at 622.

At 628, example cylinder combustion model 600 may be configured to estimate a current gamma (e.g., a current ratio of specific heats, for example, the ratio of specific heats at the current crankshaft angle and/or at the time associated with the current crankshaft angle) based at least in part on current burned fuel-air ratio determined at 624.

At 630, example cylinder combustion model 600 may be configured to estimate a current pressure in cylinder 120 (e.g., the cylinder pressure at the current crankshaft angle and/or at the time associated with the current crankshaft angle) based at least in part on the volume determined at 610, the current heat transfer to the cylinder surfaces, determined at 620, the current heat release rate determined at 626, and/or the current gamma determined at 628.

The example cylinder combustion model 600, at 632, may be configured to estimate a current temperature in cylinder 120 (e.g., the cylinder temperature at the current crankshaft angle and/or at the time associated with the current crankshaft angle) based at least in part on the volume determined at 610 and/or the current cylinder pressure determined at 630.

At 634, example cylinder combustion model 600 may be configured to estimate current piston/cylinder liner side loads (e.g., the piston/liner side loads at the current crankshaft angle and/or at the time associated with the current crankshaft angle) based at least in part on the current cylinder pressure determined at 630.

As shown in FIG. 6, at 636, cylinder combustion model 600 may be configured to estimate current friction torque (e.g., frictional losses due to torque from piston/liner side loads at the current crankshaft angle and/or at the time associated with the current crankshaft angle) based at least in part on the current cylinder pressure determined at 630 and/or the current piston/liner side loads determined at 634.

As mentioned above, incrementing model 608, may in some examples, be configured to estimate combustion-related parameters at a series of crankshaft angles according to an incremental step, for example, a single degree of crankshaft movement (e.g., angular movement). For example, following the current cylinder temperature estimation at 632, at 638, example cylinder estimation model 600 may be configured to estimate a current ignition delay. At 640, the cylinder combustion model 600 may be configured to estimate a start of combustion based at least in part on the ignition delay determined at 638. For example, at any given crankshaft angle (or position), an ignition delay may be calculated using an empirical relationship based on the cylinder pressure and cylinder temperature. The ignition delay may be representative of the resulting delay if the pressure and temperature conditions were held constant. Since temperature and pressure may be changing at every timestep, the inverse of the ignition delay may be calculated, which may effectively convert it into an incremental measure of ignition progress. In some examples, the inverse of the ignition delay may thereafter be integrated over time to provide an ignition progress variable. In some examples, once the ignition progress variable exceeds a threshold value (e.g., 1, although other threshold values are contemplated), it may be presumed that ignition has occurred.

Thereafter, at 622, cylinder combustion model 600 may, at a second crankshaft angle following the first crankshaft angle, estimate the current mass fuel burn rate at the second crankshaft angle, based at least in part on the cumulative fuel injected determined at 612 and/or the start of combustion determined at 640.

Thereafter, example cylinder combustion model 600 may be configured to estimate combustion-related parameters associated with the second crankshaft angle, for example, similar to the estimations at the first crankshaft angle at 624, 626, 628, 630, 632, 634, and/or 636. In some examples, the current cylinder temperature determined at 632 at the first crankshaft angle may be used as an input, for example, when estimating at the second crankshaft angle and/or at subsequent crankshaft angles, a current heat transfer to cylinder surfaces at 620, estimating a current gamma at 628, which, in turn, may be used to estimate, at 630, a current cylinder pressure at the second crankshaft angle and/or at subsequent crankshaft angles, and/or, at 632, a current cylinder temperature at the second crankshaft angle and/or at subsequent crankshaft angles. In some examples, cylinder combustion model 600 may use the current cylinder pressure determined for the second crankshaft angle and/or subsequent crankshaft angles, to estimate a current piston/cylinder liner side load at 634, and/or, at 636, to estimate the friction torque at the second crankshaft angle and/or subsequent crankshaft angles.

As noted above, example incrementing model 608 may serially estimate one or more of the combustion-related parameters at 620, 622, 624, 626, 628, 630, 632, 634, 636, 638, 640, and/or 642, for example, as crankshaft 402 rotates from minus-180 degrees to plus-180 degrees during a compression stroke and a power stroke. As shown in FIG. 6, as incrementing model 608 determines additional values for the combustion-related parameters at different crankshaft angles, cylinder combustion model 600 may be configured, at 642, estimate a cumulative heat transfer for the combustion event (e.g., as crankshaft 402 rotates from minus-180 degrees to plus-180 degrees) based at least in part on the accumulation of determined current heat transfers to the cylinder surfaces determined at 620. In some examples, at 644, cylinder combustion model 600 may be configured to estimate combustion-related parameters 602 for the combustion event (e.g., as crankshaft 402 rotates from minus-180 degrees to plus-180 degrees) based at least in part on the accumulation of current combustion-related parameters determined by incrementing model 608, such as, for example, one or more of the cumulative heat transfer associated with the combustion event, the indicated mean-effective pressure (IMEP), the peak cylinder pressure, the friction mean-effective pressure (FMEP), the maximum piston side load, the maximum cylinder liner bending moment, the gross indicated mean-effective pressure (GIMEP), characteristics of heat flux to cylinder surfaces, the total in-cylinder heat transfer, or the friction energy to piston and bearings, etc.

Figure 7:
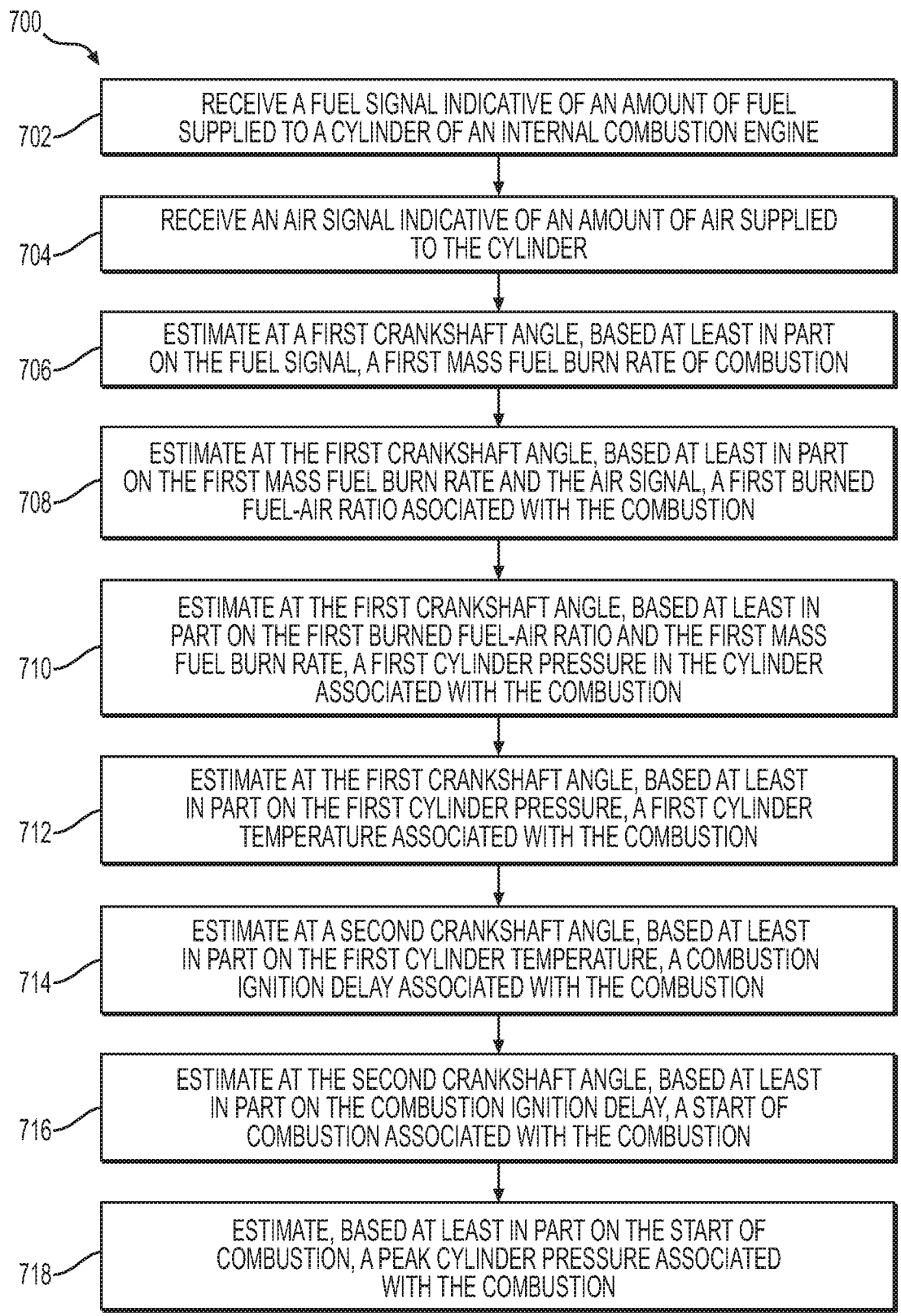
FIG. 7 is a block diagram of an example process for estimating peak cylinder pressure associated with operation of an example internal combustion engine.

FIG. 7 illustrates an example process for estimating a peak cylinder pressure associated with operation of an internal combustion engine. This process is illustrated as a logical flow graph, operation of which represents a sequence of operations, at least some of which may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

FIG. 7 illustrates a flow diagram of an example process 700 for estimating a peak cylinder pressure associated with operation of an internal combustion engine. The following actions described with respect to FIG. 7 may be performed, for example, as illustrated with respect to FIGS. 1-6. The example process 700, at 702, may include receiving a fuel signal indicative of an amount of fuel supplied to a cylinder of the internal combustion engine, for example, as described herein.

The example process 700, at 704, may include receiving an air signal indicative of an amount of air supplied to the cylinder of the internal combustion engine, for example, as described herein.

The example process 700, at 706, may include estimating at a first crankshaft angle, based at least in part on the fuel signal, a first mass fuel burn rate of combustion of the fuel and the air supplied to the cylinder, for example, as described herein.

The example process 700, at 708, may also include estimating at the first crankshaft angle, based at least in part on the first mass fuel burn rate and the air signal, a first burned fuel-air ratio associated with the combustion of the fuel and the air supplied to the cylinder, for example, as described herein.

The example process 700, at 710, may further include estimating at the first crankshaft angle, based at least in part on the first burned fuel-air ratio and the first mass fuel burn rate, a first cylinder pressure in the cylinder associated with the combustion of the fuel and the air supplied to the cylinder, for example, as described herein.

At 712, the example process 700 may also include estimating at the first crankshaft angle, based at least in part on the first cylinder pressure, a first cylinder temperature associated with the combustion of the fuel and the air supplied to the cylinder, for example, as described herein.

The example process 700, at 714, may further include estimating at a second crankshaft angle, based at least in part on the first cylinder temperature, a combustion ignition delay associated with the combustion of the fuel and the air supplied to the cylinder, for example, as described herein.

At 716, the example process 700 may also include estimating at the second crankshaft angle, based at least in part on the combustion ignition delay and an associated threshold value, a start of combustion associated with the combustion of the fuel and the air supplied to the cylinder, for example, as described herein.

The example process 700, at 718, may further include estimating, based at least in part on the start of combustion, a peak cylinder pressure associated with the combustion of the fuel and the air supplied to the cylinder, for example, as described herein. In some examples, estimating the peak cylinder pressure associated with the combustion of the fuel and the air supplied to the cylinder may include estimating cylinder temperatures associated with the combustion of the fuel and the air supplied to the cylinder through a range of crankshaft angles, for example, as described herein. In some examples, the cylinder combustion model may be configured to estimate at the second crankshaft angle, based at least in part on the start of combustion, a second mass fuel burn rate of combustion of the fuel and the air supplied to the cylinder. In some such examples, the cylinder combustion model may be configured to estimate, based at least in part on the second mass fuel burn rate, the peak cylinder pressure associated with the combustion of the fuel and the air supplied to the cylinder.

Some examples of the process 700 may also include, for example, estimating at the second crankshaft angle, based at least in part on the first cylinder temperature, heat transfer to surfaces of the cylinder associated with the combustion of the fuel and the air supplied to the cylinder. Some such examples may further include estimating, based at least in part on the heat transfer to the surfaces of the cylinder, cumulative in-cylinder heat transfer associated with the combustion of the fuel and the air supplied to the cylinder. For example, estimating the cumulative in-cylinder heat transfer associated with the combustion of the fuel and the air supplied to the cylinder may include estimating the heat transfer to the surfaces of the cylinder associated with the combustion of the fuel and the air supplied to the cylinder through a range of crankshaft angles, for example, as described herein.

In some examples of the process 700, the cylinder combustion model may be configured to estimate, based at least in part on the first cylinder temperature, a maximum piston side load associated with the combustion of the fuel and the air supplied to the cylinder. For example, the cylinder combustion model may be configured to estimate, based at least in part on the maximum piston side load, a friction torque associated with the combustion of the fuel and the air supplied to the cylinder. In some examples, the cylinder combustion model may be further configured to estimate, based at least in part on the start of combustion, a friction mean-effective pressure associated with the combustion of the fuel and the air supplied to the cylinder, for example, as described herein.

INDUSTRIAL APPLICABILITY

The exemplary systems and related methods of the present disclosure may be applicable to estimating a variety of combustion-related parameters associated with operation of internal combustion engines. Such parameters may include, for example, cumulative heat transfer associated with a combustion event, the indicated mean-effective pressure (IMEP), the peak cylinder pressure, the friction mean-effective pressure (FMEP), the maximum piston side load, the maximum cylinder liner bending moment, the gross indicated mean-effective pressure (GIMEP), characteristics of heat flux to cylinder surfaces, the total in-cylinder heat transfer, or the friction energy to piston and bearings. Estimating other combustion-related parameters is contemplated. According to some examples, the systems and methods disclosed herein may be relatively more accurate and/or may be able to respond more dynamically than other estimation systems and methods, for examples, as a result of estimating an ignition delay associated with combustion in a cylinder and/or a start of combustion in the cylinder, for example, as described herein.

Determining such combustion-related parameters may be useful, for example, to achieve more precise control of operation of internal combustion engines, which, in turn, may a result in increasing fuel efficiency and/or reducing emissions associated with operation of internal combustions engines. Such control may at least partially depend on measurement and/or calculation of different parameters involved with operation of an internal combustion engine. Although physical sensors may provide a number of such measurements, they may be unable to provide sufficient accuracy and/or responses to dynamically changing conditions during operation of an internal combustion engine. In many instances, it is not possible for physical sensors to measure certain parameters, such as, for example, parameters related to conditions inside a cylinder of the internal combustion engine during operation. The systems and methods disclosed herein may be useful for estimating combustion-related parameters that are not accurately measurable using physical sensors. In addition, estimating combustion-related parameters may be useful for estimating other characteristics, such as wear and/or maintenance cycles, which may lead to relatively reduced down time for repair.

While aspects of the present disclosure have been particularly shown and described with reference to the embodiments above, it will be understood by those skilled in the art that various additional embodiments may be contemplated by the modification of the disclosed machines, systems, and methods without departing from the spirit and scope of what is disclosed. Such embodiments should be understood to fall within the scope of the present disclosure as determined based upon the claims and any equivalents thereof.

What is claimed is:

1. A computer-implemented method for estimating a peak cylinder pressure associated with operation of an internal combustion engine, the method comprising:

receiving a fuel signal and an air signal in a cylinder combustion model configured to dynamically estimate a plurality of combustion-related parameters associated with combustion in a cylinder of the internal combustion engine, the fuel signal indicative of an amount of fuel supplied to a cylinder of the internal combustion engine, and the air signal indicative of an amount of air supplied to the cylinder of the internal combustion engine, the cylinder combustion model being configured to:
  estimate at a first crankshaft angle, based at least in part on the fuel signal, a first mass fuel burn rate of combustion of the fuel and the air supplied to the cylinder;
  estimate at the first crankshaft angle, based at least in part on the first mass fuel burn rate and the air signal, a first burned fuel-air ratio associated with the combustion of the fuel and the air supplied to the cylinder;
  estimate at the first crankshaft angle, based at least in part on the first burned fuel-air ratio and the first mass fuel burn rate, a first cylinder pressure in the cylinder associated with the combustion of the fuel and the air supplied to the cylinder;
  estimate at the first crankshaft angle, based at least in part on the first cylinder pressure, a first cylinder temperature associated with the combustion of the fuel and the air supplied to the cylinder;
  estimate at a second crankshaft angle, based at least in part on the first cylinder temperature, a combustion ignition delay associated with the combustion of the fuel and the air supplied to the cylinder;
  estimate at the second crankshaft angle, based at least in part on the combustion ignition delay and an associated threshold value, a start of combustion associated with the combustion of the fuel and the air supplied to the cylinder; and
  estimate, based at least in part on the start of combustion, a peak cylinder pressure associated with the combustion of the fuel and the air supplied to the cylinder.

2. The computer-implemented method of claim 1, wherein estimating the peak cylinder pressure associated with the combustion of the fuel and the air supplied to the cylinder comprises estimating cylinder temperatures associated with the combustion of the fuel and the air supplied to the cylinder through a range of crankshaft angles.

3. The computer-implemented method of claim 1, wherein the cylinder combustion model is further configured to:
  estimate at the second crankshaft angle, based at least in part on the first cylinder temperature, heat transfer to surfaces of the cylinder associated with the combustion of the fuel and the air supplied to the cylinder; and
  estimate, based at least in part on the heat transfer to the surfaces of the cylinder, cumulative in-cylinder heat transfer associated with the combustion of the fuel and the air supplied to the cylinder.

4. The computer-implemented method of claim 3, wherein estimating the cumulative in-cylinder heat transfer associated with the combustion of the fuel and the air supplied to the cylinder comprises estimating the heat transfer to the surfaces of the cylinder associated with the combustion of the fuel and the air supplied to the cylinder through a range of crankshaft angles.

5. The computer-implemented method of claim 1, wherein the cylinder combustion model is configured to estimate, based at least in part on the first cylinder temperature, a maximum piston side load associated with the combustion of the fuel and the air supplied to the cylinder.

6. The computer-implemented method of claim 5, wherein the cylinder combustion model is configured to estimate, based at least in part on the maximum piston side load, a friction torque associated with the combustion of the fuel and the air supplied to the cylinder.

7. The computer-implemented method of claim 1, wherein the cylinder combustion model is further configured to:
  estimate at the second crankshaft angle, based at least in part on the start of combustion, a second mass fuel burn rate of combustion of the fuel and the air supplied to the cylinder; and
  estimate, based at least in part on the second mass fuel burn rate, the peak cylinder pressure associated with the combustion of the fuel and the air supplied to the cylinder.

8. The computer-implemented method of claim 1, wherein the cylinder combustion model is further configured to estimate, based at least in part on the start of combustion, a friction mean-effective pressure associated with the combustion of the fuel and the air supplied to the cylinder.

9. A computer-readable storage medium having computer-executable instructions stored thereupon which, when executed by a computer, cause the computer to:
  receive a fuel signal indicative of an amount of fuel supplied to a cylinder of an internal combustion engine during operation;
  receive an air signal indicative of an amount of air supplied to the cylinder of the internal combustion engine during operation;
  estimate at a first crankshaft angle, based at least in part on the fuel signal, a first mass fuel burn rate of combustion of the fuel and the air supplied to the cylinder;
  estimate at the first crankshaft angle, based at least in part on the first mass fuel burn rate and the air signal, a first burned fuel-air ratio associated with the combustion of the fuel and the air supplied to the cylinder;
  estimate at the first crankshaft angle, based at least in part on the first burned fuel-air ratio and the first mass fuel burn rate, a first cylinder pressure in the cylinder associated with the combustion of the fuel and the air supplied to the cylinder;
  estimate at the first crankshaft angle, based at least in part on the first cylinder pressure, a first cylinder temperature associated with the combustion of the fuel and the air supplied to the cylinder;
  estimate at a second crankshaft angle, based at least in part on the first cylinder temperature, a combustion ignition delay associated with the combustion of the fuel and the air supplied to the cylinder;
  estimate at the second crankshaft angle, based at least in part on the combustion ignition delay and an associated threshold value, a start of combustion associated with the combustion of the fuel and the air supplied to the cylinder; and
  estimate, based at least in part on the start of combustion, a peak cylinder pressure associated with the combustion of the fuel and the air supplied to the cylinder.

10. The computer-readable storage medium of claim 9, wherein estimating the peak cylinder pressure associated with the combustion of the fuel and the air supplied to the cylinder comprises estimating cylinder temperatures associated with the combustion of the fuel and the air supplied to the cylinder through a range of crankshaft angles.

11. The computer-readable storage medium of claim 9, wherein the computer is further caused to:
  estimate at the second crankshaft angle, based at least in part on the first cylinder temperature, heat transfer to surfaces of the cylinder associated with the combustion of the fuel and the air supplied to the cylinder; and estimate, based at least in part on the heat transfer to the surfaces of the cylinder, cumulative in-cylinder heat transfer associated with the combustion of the fuel and the air supplied to the cylinder.

12. The computer-readable storage medium of claim 11, wherein estimating the cumulative in-cylinder heat transfer associated with the combustion of the fuel and the air supplied to the cylinder comprises estimating the heat transfer to the surfaces of the cylinder associated with the combustion of the fuel and the air supplied to the cylinder through a range of crankshaft angles.

13. The computer-readable storage medium of claim 9, wherein the computer is further caused to estimate, based at least in part on the first cylinder temperature, a maximum piston side load associated with the combustion of the fuel and the air supplied to the cylinder.

14. The computer-readable storage medium of claim 13, wherein the computer is further caused to estimate, based at least in part on the maximum piston side load, a friction torque associated with the combustion of the fuel and the air supplied to the cylinder.

15. The computer-readable storage medium of claim 9, wherein the computer is further caused to:
  estimate at the second crankshaft angle, based at least in part on the start of combustion, a second mass fuel burn rate of combustion of the fuel and the air supplied to the cylinder; and
  estimate, based at least in part on the second mass fuel burn rate, the peak cylinder pressure associated with the combustion of the fuel and the air supplied to the cylinder.

16. The computer-readable storage medium of claim 9, wherein the computer is further caused to estimate, based at least in part on the start of combustion, a friction mean-effective pressure associated with the combustion of the fuel and the air supplied to the cylinder.

17. A system for estimating a peak cylinder pressure associated with operation of an internal combustion engine, the system comprising:
  at least one processor configured to cause execution of a cylinder combustion model configured to dynamically estimate a plurality of combustion-related parameters associated with combustion in the cylinder of the internal combustion engine, the cylinder combustion model configured to:
    receive a fuel signal indicative of an amount of fuel supplied to a cylinder of the internal combustion engine;
    receive an air signal indicative of an amount of air supplied to the cylinder of the internal combustion engine;
    estimate at a first crankshaft angle, based at least in part on the fuel signal, a first mass fuel burn rate of combustion of the fuel and the air supplied to the cylinder;
    estimate at the first crankshaft angle, based at least in part on the first mass fuel burn rate and the air signal, a first burned fuel-air ratio associated with the combustion of the fuel and the air supplied to the cylinder;
    estimate at the first crankshaft angle, based at least in part on the first burned fuel-air ratio and the first mass fuel burn rate, a first cylinder pressure in the cylinder associated with the combustion of the fuel and the air supplied to the cylinder;
    estimate at the first crankshaft angle, based at least in part on the first cylinder pressure, a first cylinder temperature associated with the combustion of the fuel and the air supplied to the cylinder;
    estimate at a second crankshaft angle, based at least in part on the first cylinder temperature, a combustion ignition delay associated with the combustion of the fuel and the air supplied to the cylinder;
    estimate at the second crankshaft angle, based at least in part on the combustion ignition delay and an associated threshold value, a start of combustion associated with the combustion of the fuel and the air supplied to the cylinder; and
    estimate, based at least in part on the start of combustion, a peak cylinder pressure associated with the combustion of the fuel and the air supplied to the cylinder; and
  an output device in communication with the at least one processor and configured to output an indication of the peak cylinder pressure.

18. The system of claim 17, wherein estimating the peak cylinder pressure associated with the combustion of the fuel and the air supplied to the cylinder comprises estimating cylinder temperatures associated with the combustion of the fuel and the air supplied to the cylinder through a range of crankshaft angles.

19. The system of claim 17, wherein the cylinder combustion model is further configured to:
  estimate at the second crankshaft angle, based at least in part on the first cylinder temperature, heat transfer to surfaces of the cylinder associated with the combustion of the fuel and the air supplied to the cylinder; and
  estimate, based at least in part on the heat transfer to the surfaces of the cylinder, cumulative in-cylinder heat transfer associated with the combustion of the fuel and the air supplied to the cylinder.

20. The system of claim 19, wherein estimating the cumulative in-cylinder heat transfer associated with the combustion of the fuel and the air supplied to the cylinder comprises estimating the heat transfer to the surfaces of the cylinder associated with the combustion of the fuel and the air supplied to the cylinder through a range of crankshaft angles.

* * * * *